May 22, 1962 H. L. KING 3,035,589
CONTACT LENS CONTAINER
Filed Dec. 8, 1960
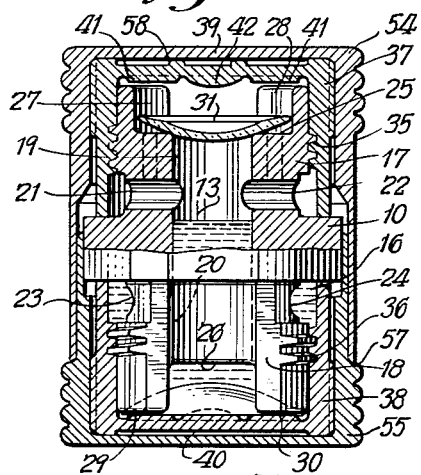
Fig. 1.
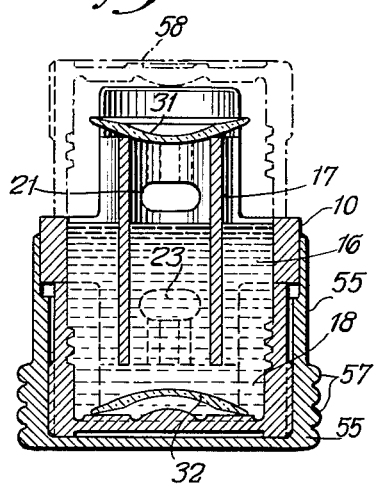
Fig. 2.
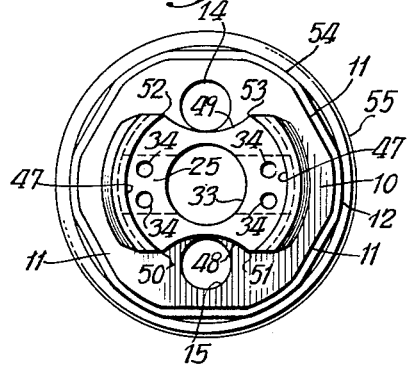
Fig. 3.
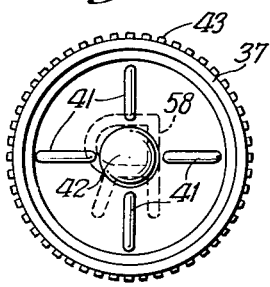
Fig. 4.
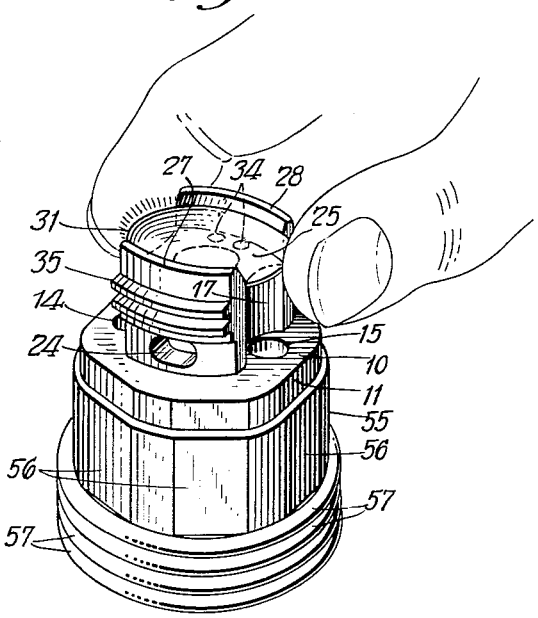
Fig. 5.
Fig. 6.
INVENTOR.
H. LAWRENCE KING.
BY
Ward, Neal, Haselton, Orme & McClannon
ATTORNEYS.

United States Patent Office 3,035,589
Patented May 22, 1962

3,035,589
CONTACT LENS CONTAINER
Harold Lawrence King, 210 Commonwealth Ave.,
Mount Vernon, N.Y.
Filed Dec. 8, 1960, Ser. No. 87,731
3 Claims. (Cl. 134—137)

This invention relates to containers for small objects and particularly to fluid-tight containers for contact lenses.

Contact lenses are well known in the art and are relatively small being of the order of 9 to 12 millimeters in diameter. Containers for such lenses which may be carried readily by a user are desirable, and it is the practice to make such containers fluid-tight and to immerse for a varying time and/or continuously bathe the lenses in the container with a fluid or to maintain the lenses in the vapor of such fluid.

Containers for contact lenses are well known in the art, but the prior art type of constructions have certain disadvantages. Some containers are relatively bulky, other containers are unsatisfactory because it is necessary to dump the lenses and hence the bathing fluid from the container each time that the lens is removed and other containers are unsatisfactory because the lenses are clamped or held between parts which engage the surfaces of the lenses and hence can scratch or otherwise mar the surfaces of the lenses especially if the clamping parts are dry through error or otherwise.

The container of the invention is relatively small and comprises a pair of oppositely extending portions, each having a space therein for loosely receiving a contact lens. The portions are formed so that the user may grasp a lens at its edge while it is lying in the lens receiving space, and therefore, the user can firmly grasp the lens while inserting it into the container or removing it therefrom. With the container of the invention it is unnecessary to remove the fluid from the container while removing the lens or to pry the lens out with a fingernail or other possibly damaging object. In addition, the aforementioned portions are interconnected by fluid passageways, and the container is provided with a pair of fluid-tight caps which may be screwed onto or otherwise be secured to the lens receiving portions. Thus, by only partially filling the container with the bathing fluid, the fluid will be held in one part of the container while a lens is being removed from the opposite part of the container and vice versa.

In accordance with a further feature of the invention, the container is provided with a pair of covers which protect the container against damage and consequent leakage of the bathing fluid and which facilitate removal of the caps for the purpose of inserting or removing a lens.

One object of the invention is to provide a relatively small container for contact lenses which permits a user to insert or remove a contact lens by grasping the edge of the lens.

Another object of the invention is to provide a contact lens container which will permit the insertion or removal of a lens without the loss of bathing fluid.

Other objects and advantages of the invention will be apparent from the following detailed description of a preferred embodiment thereof, which description should be considered in conjunction with the accompanying drawing in which:

FIG. 1 is a cross-sectional, side elevation view of the preferred embodiment of the invention;

FIG. 2 is a cross-sectional, side elevation view of a portion of the embodiment shown in FIG. 1, the view of FIG. 2 being taken at 90° with respect to the view shown in FIG. 1, one cover being removed and one of the caps being shown in dotted lines;

FIG. 3 is an end elevation view of the embodiment shown in FIGS. 1 and 2 with the cap and the cover removed from one end of the container;

FIG. 4 is an end elevation view of one of the caps for the container;

FIG. 5 is a perspective view of the container with a cover and a cap removed and illustrates the manner of inserting and removing a contact lens; and FIG. 6 is a fragmentary, cross-sectional view of a modified form of the cap edge.

The preferred embodiment of the invention illustrated in FIGS. 1 through 5 comprises a wall 10 having a plurality of peripherally and angularly disposed flat surfaces 11 which may be grasped by the user or which may be engaged by the cover 55 to assist in removing the caps hereinafter described. The wall 10 has a centrally disposed aperture 13 and a pair of offset apertures 14 and 15 which permit the bathing fluid 16 to flow from one part of the container to the other and vapor to circulate. It will be apparent that other or different apertures differently disposed may also be provided through the wall 10.

A pair of tubes extend perpendicularly from opposite sides of the wall 10 and have central bores 19 and 20 which are aligned with the opening 13 in the wall 10. To assist in permitting the fluid to flow from one part of the container to the other when the container is inverted, each tube 17 and 18 may be provided with apertures 21—24 therein which extend from outside of the tubes to the interior thereof and which are adjacent a face of the wall 10.

The tubes 17 and 18 act as supports for platforms 25 and 26 and for the arcuate extensions or fingers 27–30. The contact lenses 31 and 32 are supported by the platforms 25 and 26 and are loosely held between the fingers 27 and 28 and 29 and 30. Each of the platforms 25 and 26 is provided with one or more apertures, such as the apertures 33 and 34 in the platform 25, which permit the bathing fluid to flow away from the platform 25 when the container is in the position illustrated in FIGS. 1, 2 and 5. The aperture 34 may be made small enough to hold some fluid by capillary action and thus aid in maintaining high vapor content in the upper part of the container (but not permitting fluid to spill).

Each of the tubes 17 and 18 is provided with external screw threads 35 and 36, which are discontinuous around the periphery of the tubes and which mate with corresponding screw threads on the interior walls of the fluid-tight caps 37 and 38. The open ends of the sealing caps 37 and 38 abut the opposite faces of the wall 10 and form a fluid-tight seal therewith. Each of the caps is provided with an end wall 39 and 40 having inwardly extending ribs 41 and 42, shown in greater detail in FIG. 4, which prevent the contact lenses 31 and 32 from sticking or adhering to the end wall of a cap when the cap is removed. The peripheral surfaces of the caps 37 and 38 may be roughened or provided with knurls or flutes 43 (FIG. 4) to facilitate screwing and unscrewing of the caps 37 and 38 on the tubes 17 and 18.

If desired, the ends of the caps 37 and 38 may be modified as illustrated in FIG. 6 or otherwise so as to improve the seal between the ends of the caps and the faces of the wall 10. As shown in FIG. 6 the cap 37a has an undercut portion 44 and a feather edge 45 which flexes as the end of the cap engages a face of the wall 10, acting as a gasket.

The inner and facing arcuate surfaces 46 and 47 of the extensions or fingers 27 and 28, and the corresponding surfaces of the fingers 29 and 30 are spaced apart a distance slightly greater than the largest lens to be received, which as mentioned above, normally is about 12 millimeters in diameter. Thus, the radii and hence the diameter of the arcs of the surfaces 46 and 47 are slightly greater than the diameter of the largest contact lens to be received in the container.

In the preferred embodiment of the invention, the tubes 17 and 18, the platforms 25 and 26 and the fingers or extensions 27–30 are formed identically and therefore in the description hereinafter given, it will be understood that although specific reference will be made only to tube 17 and the parts supported thereby or extending therefrom, the opposite tube 18 and the parts supported thereby are similarly formed.

The walls of the tube 17 intermediate the edges 50–53 of the fingers or extensions 27 and 28 are indented as at 48 and 49 so that the edges of a contact lens, such as the lens 31, mounted on the platform 25 will overhang the indented portions 48 and 49 thereby permitting a user to bottom, securely by feel only (if necessary) the lens 31 against the platform 25 when placing the lens 31 on the platform 25 or to grasp the lens 31 securely at its edges when removing the lens 31 from the container. The indentations 48 and 49 are large enough to receive the tips of the fingers (including a thumb) of a lens user and the spacing between the edges 52 and 53 and the edges 50 and 51 is also large enough to receive the tips of the fingers of a user. However, the spacing between the edges 52 and 53 and the edges 50 and 51 is small enough so that the smallest size contact lens, such as a lens having a diameter of 9 millimeters, cannot be displaced sideways a sufficient distance to permit it to engage the wall of the cap 37 or the interior threads on the interior wall of the cap 37. If the spacing between the edges 52 and 53 and the edges 50 and 51 were larger than this amount so that the edge of a contact lens, such as the lens 31, were engaged by the interior wall or end of the cap 37 damage to the lens 31 could result when the cap 37 is screwed onto the tube 17.

It will be apparent from the foregoing that the shortest distance between the indentations 48 and 49 is substantially less than the distance between the inner surfaces 46 and 47. Furthermore, it will be apparent that the arcuate length of the surfaces 46 and 47 are each substantially less than one-half the circumference of a circle having a diameter equal to the diameter of the arcs of the surfaces 46 and 47. Also, it will be apparent to those skilled in the art that the lenses 31 and 32 may be held in positions inverted from those shown in FIGS. 1, 2 and 5.

The parts of the container heretofore described may be made from various materials but preferably they are made of a compatible synthetic resin, such as polyethylene. If the caps 37 and 38 are made from a flexible synthetic resin such as flexible polyethylene, it may be desirable to protect the container by rigid telescoping covers 54 and 55 because frequently the container is carried in the pocket of a wearer. The covers 54 and 55 may for example, be made or a rigid synthetic resin or may be formed from brass or other metals. The end of the cap 55 is formed so as to provide a sliding engagement with the peripheral surfaces of the wall 10 and is provided with a plurality of exterior, angularly disposed flat surfaces 56 so as to assist the user in holding the container while the cap 37 is screwed or unscrewed. The cap 55 may be provided at its end with a plurality of ridges 57 for decorative and mechanical purposes or it may be formed in any other manner. It will be noted that the cover 55, in addition to providing mechanical protection for the cap 38, also acts as a wrench while the user is turning the cap 37 on or off the tube 17.

The cap 54 may be identical to the cap 55 so that it may be used in the same manner as the cover 55. Alternatively, the cover 54 may be formed as illustrated in FIG. 1 so that the interior wall thereof is in telescopic engagement with the exterior wall of the cover 55. Thus, the inner wall of the cover 54 may be cylindrical as shown in FIG. 3 to simplify the manufacture thereof.

Of course, if desired the covers 54 and 55 may be omitted, and the wall 10 may be held by the user by grasping the flat surfaces 11 during the process of turning the caps 37 or 38.

In use, the cover 54 is removed and the container of the invention is held upright as illustrated in FIGS. 1, 2 and 5. In this position, the fluid 16 flows to the bottom of the container so that there is substantially no fluid above the upper face of the wall 10 as viewed in FIGS. 1, 2 and 5 except that which may be held by capillary action. The cap 37 is then unscrewed while holding the cover 55. After the cap 37 has been removed, the lens 31 is removed from the platform 25 and from between the fingers 27 and 28 by grasping the edge of the lens 31 with the fingers as illustrated in FIG. 5.

After the lens 31 is removed the cap 37 is again placed on the tube 17 by screwing it thereon until the end of the cap 37 is in fluid-tight engagement with the upper face of the wall 10. The container of the invention is then inverted from the position shown in FIGS. 1, 2 and 5 to cause the bathing fluid 16 to flow to the oposite end of the container. The cover 55 is removed and may then be placed over the cap 37 so that it may be used as a wrench while removing the cap 38. The cap 38 is then removed and the lens 32 may be removed as described above in connection with the removal of lens 31.

When the lenses are reinserted in the container the steps described above may be formed in reversed order. However, it will be noted that since the user grasps the lenses at their edges, it is unlikely that the lenses will stick to the fingers of the user, and in addition, as the user presses a lens against the associated platform he can tell by the resistance thus encountered that the lens has actually engaged its supporting platform. Furthermore, because of the indentations 48 and 49 the user's fingers may continue toward a face of the wall 10 after the lens has engaged a platform and the user may therefore release the lens by a wiping action between his fingers and the edge of a lens. It should be noted here that due to the small size and light weight of the lenses it has been difficult for a user with prior art lens containers or cases to know when the lens is in its proper place especially in dark or dim light or when user has poor vision, and to avoid accidental removal of the lens because of sticking of the lens to the user's fingers. To assist in identifying one cap and the associated lens, the cap 37 may have visual and tactile identifying portions, such as the raised portions 58.

Although in the preferred embodiment of the invention, screw threads are employed to secure the caps 37 and 38 to the tubes 17 and 18 and hence to the wall 10, it will be apparent to those skilled in the art that other known types of securing means may be employed. Similarly although the peripheral edge or surface of the wall 10 is made irregular by the use of angularly disposed flat surfaces 11, it will be apparent to those skilled in the art that other irregular surfaces may be employed on or the peripheral surface may be irregularly formed in other manners well known to those skilled in the art to aid in holding the wall 10 during the turning of the caps 37 and 38.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A container for contact lenses comprising: two oppositely disposed, aligned portions joined together by a wall having a plurality of circumferentially and angularly disposed, edge surfaces, each of said portions comprising a tube extending outwardly from said wall with the axis thereof substantially perpendicular to said wall, a platform mounted on the end of said tube remote from said wall, said platform having an aperture therethrough permitting the flow of fluid from the exterior of said platform to the interior of said tube, a pair of spaced arcuate portions mounted on said end of said tube at opposite sides of said platform and extending in a direction away from said wall, said last-mentioned portions and said platform being adapted to receive and retain a contact lens with a face of the lens facing said platform, the side portions of said tube intermediate said arcuate portions being inwardly indented to permit a contact lens on said platform to overhang said side portions and to permit the fingers of a lens user to grasp the edge of a lens on said platform and said wall having apertures therethrough permitting the flow of fluid from one of said first-mentioned portions to the other thereof through said wall, said tube also having exterior, discontinuous screw threads thereon; and a pair of cup-like sealing caps, one for each of said first-mentioned portions, each of said caps having a cylindrical portion with an interior wall of greater diameter than the diameter of a lens to be contained in said container and having interior screw threads mating with the screw threads on said tube, one end of said cylindrical portion being engageable with said first-mentioned wall to form a fluid-tight seal therewith and the other end thereof being closed by an end wall having ribs extending inwardly of said cap.

2. A container for contact lenses comprising: two oppositely disposed, aligned portions joined together by a wall having a plurality of circumferentially and angularly disposed, edge surfaces, each of said portions comprising a tube extending outwardly from said wall with the axis thereof substantially perpendicular to said wall, a platform mounted on the end of said tube remote from said wall, said platform having an aperture therethrough permitting the flow of fluid from the exterior of said platform to the interior of said tube, a pair of spaced arcuate portions mounted on said end of said tube at opposite sides of said platform and extending in a direction away from said wall, said last-mentioned portions and said platform being adapted to receive and retain a contact lens with a face of the lens facing said platform, the side portions of said tube intermediate said arcuate portions being inwardly indented to permit a contact lens on said platform to overhang said side portions and to permit the fingers of a lens user to grasp the edge of a lens on said platform, and said wall having apertures therethrough permitting the flow of fluid from one of said first-mentioned portions to the other thereof through said wall, said tube also having exterior, discontinuous screw threads thereon; a pair of cup-like sealing caps, one for each of said first-mentioned portions, each of said caps having a cylindrical portion with an interior wall of greater diameter than the diameter of a lens to be contained in said container and having interior screw threads mating with the screw threads on said tube, one end of said cylindrical portion being engageable with said first-mentioned wall to form a fluid-tight seal therewith and the other end thereof being closed by an end wall having ribs extending inwardly of said cap, and a pair of cup-like covers, one fitting over one of said caps and the other fitting over the other of said caps and at least one of said covers engaging said edge surfaces of said first-mentioned wall and having peripherally disposed flat surfaces on the exterior thereof to facilitate gripping of the cover and screwing and unscrewing of said caps.

3. A container for contact lenses comprising: two oppositely disposed, aligned portions joined together by a wall having a plurality of circumferentially and angularly disposed, edge surfaces, each of said portions comprising a tube extending outwardly from said wall with the axis thereof substantially perpendicular to said wall, said tube having a pair of apertures therein adjacent said wall and extending from the exterior thereof to the interior thereof, a platform mounted on the end of said tube remote from said wall, said platform having an aperture therethrough permitting the flow of fluid from the exterior of said platform to the interior of said tube, a pair of spaced arcuate portions mounted on said end of said tube at opposite sides of said platform and extending in a direction away from said wall, said last-mentioned portions and said platform being adapted to receive and retain a contact lens with a face of the lens facing said platform, the side portions of said tube intermediate said arcuate portions being inwardly indented to permit a contact lens on said platform to overhang said side portions and to permit the fingers of a lens user to grasp the edge of a lens on said platform, and said wall having apertures therethrough permitting the flow of fluid from one of said first-mentioned portions to the other thereof through said wall, said tube also having exterior, discontinuous screw threads thereon; a pair of cup-like sealing caps, one for each of said first-mentioned portions, each of said caps having a cylindrical portion with an interior wall of greater diameter than the diameter of a lens to be contained in said container and having interior screw threads mating with the screw threads on said tube, one end of said cylindrical portion being engageable with said first-mentioned wall to form a fluid-tight seal therewith and the other end thereof being closed by an end wall having ribs extending inwardly of said cap; and a pair of cup-like covers, one fitting over one of said caps and engaging said edge surfaces of said first-mentioned wall and the other fitting over the other of said caps and in telescoping engagement with said one cover, said one cover having peripherally disposed flat surfaces on the exterior thereof to facilitate gripping of said one cover and screwing and unscrewing of said caps.

References Cited in the file of this patent
UNITED STATES PATENTS

| | | |
|---|---|---|
| 181,773 | Cunningham | Sept. 5, 1876 |
| 2,522,909 | Wadanoli | Sept. 19, 1950 |
| 2,944,661 | Goldstein | July 12, 1960 |